(12) United States Patent
Carr (10) Patent No.: US 9,282,383 B2
(45) Date of Patent: Mar. 8, 2016

(54) PROCESS, DEVICE AND SYSTEM FOR VOLT/VAR OPTIMIZATION

(75) Inventor: Jim Carr, Monticello, IN (US)

(73) Assignee: Trilliant Incorporated, Redwood City, CA (US)

( * ) Notice: Subject to any disclaimer, the term of this patent is extended or adjusted under 35 U.S.C. 154(b) by 872 days.

(21) Appl. No.: 13/349,701

(22) Filed: Jan. 13, 2012

(65) Prior Publication Data

US 2012/0182157 A1 Jul. 19, 2012

Related U.S. Application Data (60) Provisional application No. 61/432,815, filed on Jan. 14, 2011.

(51) Int. Cl.
| | |
|---|---|
| *G08B 23/00* | (2006.01) |
| *G08C 15/06* | (2006.01) |
| *G01R 21/00* | (2006.01) |
| *G01R 21/06* | (2006.01) |
| *G01R 19/00* | (2006.01) |
| *H04Q 9/00* | (2006.01) |
| *G01D 4/00* | (2006.01) |

(52) U.S. Cl.
CPC ............... *H04Q 9/00* (2013.01); *G01D 4/002* (2013.01); *G01D 4/004* (2013.01); *G01D 4/006* (2013.01); *H04Q 2209/25* (2013.01); *H04Q 2209/60* (2013.01); *Y02B 90/246* (2013.01); *Y04S 20/221* (2013.01); *Y04S 20/222* (2013.01); *Y04S 20/42* (2013.01)

(58) Field of Classification Search
USPC .................................. 340/870.02; 702/61, 64
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |

(Continued)

FOREIGN PATENT DOCUMENTS

| | | | | |
|---|---|---|---|---|
| EP | 0 578 041 B1 | 11/1999 | | H04L 12/56 |
| EP | 0 663 746 B1 | 1/2003 | | H04L 12/46 |

(Continued)

OTHER PUBLICATIONS

Hydro One Networks, Inc., Request for Proposal for Smart Metering Services, 16 pp., Mar. 4, 2005.

(Continued)

*Primary Examiner* — Mohamed Barakat
(74) *Attorney, Agent, or Firm* — Moser Taboada (57) ABSTRACT

Embodiments of the invention propose volt/VAR optimization that may be time synchronized and automated based on actions invoked at a control system utilizing a smart grid solution that incorporates metering end points which are capable of reporting to a utility the information that is needed by the utility or to another system for making real time decisions on events that may occur at the distribution level. Embodiments of the invention incorporate large numbers of end points (e.g., smart meters) which a utility can use to determine how any event or events it may invoke at the grid level affect its compliance at the end user level.

24 Claims, 2 Drawing Sheets

(56) References Cited

U.S. PATENT DOCUMENTS

| | | | |
|---|---|---|---|
| 4,638,314 A | 1/1987 | Keller | 340/870.02 |
| 4,644,320 A | 2/1987 | Carr et al. | 340/12.37 |
| 4,749,992 A | 6/1988 | Fitzmeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |
| 5,138,615 A | 8/1992 | Lamport et al. | 370/94.3 |
| 5,159,592 A | 10/1992 | Perkins | 370/338 |
| 5,216,623 A | 6/1993 | Barrett et al. | 364/550 |
| 5,276,680 A | 1/1994 | Messenger | 370/311 |
| 5,311,581 A | 5/1994 | Merriam et al. | 379/106.07 |
| 5,400,338 A | 3/1995 | Flammer, III et al. | 370/255 |
| 5,430,729 A | 7/1995 | Rahnema | 370/409 |
| 5,432,507 A | 7/1995 | Mussino et al. | 340/870.03 |
| 5,453,977 A | 9/1995 | Flammer, III et al. | 370/254 |
| 5,459,727 A | 10/1995 | Vannucci | 370/332 |
| 5,463,777 A | 10/1995 | Bialkowski et al. | |
| 5,465,398 A | 11/1995 | Flammer | 455/69 |
| 5,467,345 A | 11/1995 | Cutter, Jr. et al. | 370/229 |
| 5,471,469 A | 11/1995 | Flammer, III et al. | 370/346 |
| 5,479,400 A | 12/1995 | Dilworth et al. | 370/331 |
| 5,488,608 A | 1/1996 | Flammer, III | 370/400 |
| 5,515,369 A | 5/1996 | Flammer, III et al. | 370/480 |
| 5,515,509 A | 5/1996 | Rom | 709/228 |
| 5,528,507 A | 6/1996 | McNamara et al. | 700/286 |
| 5,544,036 A | 8/1996 | Brown, Jr. et al. | 364/145 |
| 5,553,094 A | 9/1996 | Johnson et al. | 375/130 |
| 5,570,084 A | 10/1996 | Retter et al. | 370/338 |
| 5,572,438 A | 11/1996 | Ehlers et al. | 700/295 |
| 5,572,528 A | 11/1996 | Shuen | 370/402 |
| 5,596,722 A | 1/1997 | Rahnema | 709/241 |
| 5,608,721 A | 3/1997 | Natarajan et al. | 370/238 |
| 5,608,780 A | 3/1997 | Gerszberg et al. | 455/436 |
| 5,623,495 A | 4/1997 | Eng et al. | 370/397 |
| 5,659,300 A | 8/1997 | Dresselhuys et al. | 340/870.02 |
| 5,673,252 A | 9/1997 | Johnson et al. | 370/449 |
| 5,684,710 A | 11/1997 | Ehlers et al. | 700/293 |
| 5,696,501 A | 12/1997 | Ouellette et al. | 340/870.02 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,726,644 A | 3/1998 | Jednacz et al. | 340/825.52 |
| 5,727,057 A | 3/1998 | Emery et al. | 379/201.07 |
| 5,737,318 A | 4/1998 | Melnik | 370/254 |
| 5,740,366 A | 4/1998 | Mahany et al. | 709/227 |
| 5,748,104 A | 5/1998 | Argyroudis et al. | 340/870.11 |
| 5,757,783 A | 5/1998 | Eng et al. | 370/315 |
| 5,758,331 A | 5/1998 | Johnson | 705/412 |
| 5,761,083 A | 6/1998 | Brown, Jr. et al. | 364/492 |
| 5,767,790 A | 6/1998 | Jovellana | 340/870.02 |
| 5,774,660 A | 6/1998 | Brendel et al. | 709/201 |
| 5,812,531 A | 9/1998 | Cheung et al. | 370/255 |
| 5,822,309 A | 10/1998 | Ayanoglu et al. | 370/315 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,901,067 A | 5/1999 | Kao et al. | 700/11 |
| 5,903,566 A | 5/1999 | Flammer, III | 370/406 |
| 5,914,672 A | 6/1999 | Glorioso et al. | 340/870.02 |
| 5,914,673 A | 6/1999 | Jennings et al. | 340/870.03 |
| 5,919,247 A | 7/1999 | Van Hoff et al. | 709/217 |
| 5,920,697 A | 7/1999 | Masters et al. | 709/219 |
| 5,926,531 A | 7/1999 | Petite | 379/144.04 |
| 5,933,092 A | 8/1999 | Ouellette et al. | 340/870.02 |
| 5,953,371 A | 9/1999 | Rowsell et al. | 375/220 |
| 5,963,146 A | 10/1999 | Johnson et al. | 340/870.01 |
| 5,963,457 A | 10/1999 | Kanoi et al. | 364/528.26 |
| 5,974,236 A | 10/1999 | Sherman | 709/221 |
| 5,986,574 A | 11/1999 | Colton | 340/870.02 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,018,659 A | 1/2000 | Ayyagari et al. | 455/431 |
| 6,026,133 A | 2/2000 | Sokoler | 375/365 |
| 6,028,522 A | 2/2000 | Petite | 340/641 |
| 6,044,062 A | 3/2000 | Brownrigg et al. | 370/238 |
| 6,058,355 A | 5/2000 | Ahmed et al. | 702/62 |
| 6,061,609 A | 5/2000 | Kanoi et al. | 700/291 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,084,867 A | 7/2000 | Meier | 370/338 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,118,269 A | 9/2000 | Davis | 324/110 |
| 6,122,603 A | 9/2000 | Budike, Jr. | 702/182 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,169,979 B1 | 1/2001 | Johnson | 705/412 |
| 6,172,616 B1 | 1/2001 | Johnson et al. | 340/870.12 |
| 6,195,018 B1 | 2/2001 | Ragle et al. | 340/870.01 |
| 6,218,953 B1 | 4/2001 | Petite | 340/641 |
| 6,233,327 B1 | 5/2001 | Petite | 379/155 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,298,053 B1 | 10/2001 | Flammer, III et al. | 370/349 |
| 6,300,881 B1 | 10/2001 | Yee et al. | 340/870.02 |
| 6,304,556 B1 | 10/2001 | Haas | 370/254 |
| 6,311,105 B1 | 10/2001 | Budike, Jr. | 700/291 |
| 6,338,087 B1 | 1/2002 | Okanoue | 709/222 |
| 6,362,745 B1 | 3/2002 | Davis | 340/637 |
| 6,363,057 B1 | 3/2002 | Ardalan et al. | 370/252 |
| 6,366,217 B1 | 4/2002 | Cunningham et al. | 340/870.31 |
| 6,369,719 B1 | 4/2002 | Tracy et al. | 340/870.02 |
| 6,369,769 B1 | 4/2002 | Nap et al. | 343/719 |
| 6,373,399 B1 | 4/2002 | Johnson et al. | 340/870.11 |
| 6,396,839 B1 | 5/2002 | Ardalan et al. | 370/401 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,430,268 B1 | 8/2002 | Petite | 379/39 |
| 6,437,692 B1 | 8/2002 | Petite et al. | 340/540 |
| 6,457,054 B1 | 9/2002 | Bakshi | 709/227 |
| 6,480,497 B1 | 11/2002 | Flammer, III et al. | 370/400 |
| 6,480,505 B1 | 11/2002 | Johansson et al. | 370/449 |
| 6,492,910 B1 | 12/2002 | Ragle et al. | 340/870.02 |
| 6,509,841 B1 | 1/2003 | Colton et al. | 340/870.11 |
| 6,522,974 B2 | 2/2003 | Sitton | 702/17 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,618,578 B1 | 9/2003 | Petite | 455/92 |
| 6,618,772 B1 | 9/2003 | Kao et al. | 710/15 |
| 6,628,764 B1 | 9/2003 | Petite | 379/106.01 |
| 6,633,823 B2 | 10/2003 | Bartone et al. | 702/57 |
| 6,636,894 B1 | 10/2003 | Short et al. | 709/225 |
| 6,650,249 B2 | 11/2003 | Meyer et al. | 340/870.28 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |

(56) References Cited

U.S. PATENT DOCUMENTS

| | | | |
|---|---|---|---|
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B1 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Mayer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 * | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 6,249,516 C1 | 11/2008 | Brownrigg et al. | 370/338 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | |
| 7,548,826 B2 | 6/2009 | Witter et al. | 702/115 |
| 7,548,907 B2 | 6/2009 | Wall et al. | |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |

(56) References Cited

U.S. PATENT DOCUMENTS

| | | | |
|---|---|---|---|
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,733,224 B2 | 6/2010 | Tran | 340/540 |
| 7,743,224 B2 | 6/2010 | Wang | 711/154 |
| 7,756,538 B2 | 7/2010 | Bonta et al. | 455/517 |
| 7,788,491 B1 | 8/2010 | Dawson | 713/168 |
| 7,802,245 B2 | 9/2010 | Sonnier et al. | 717/171 |
| 7,814,322 B2 | 10/2010 | Gurevich et al. | 713/171 |
| 7,818,758 B2 | 10/2010 | de Bonet et al. | 719/328 |
| 7,847,706 B1 | 12/2010 | Ross et al. | 340/12.52 |
| 8,051,415 B2 | 11/2011 | Suzuki | 717/168 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0014633 A1 | 1/2003 | Gruber | 713/170 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/352 |
| 2003/0156715 A1 | 8/2003 | Reeds, III et al. | 380/37 |
| 2003/0207697 A1 | 11/2003 | Shpak | 455/524 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0081086 A1 | 4/2004 | Hippelainen et al. | 370/227 |
| 2004/0082203 A1 | 4/2004 | Logvinov et al. | 439/10 |
| 2004/0100953 A1 | 5/2004 | Chen et al. | 370/389 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0193329 A1 | 9/2004 | Ransom et al. | 700/286 |
| 2004/0210544 A1 | 10/2004 | Shuey et al. | 705/412 |
| 2004/0268142 A1 | 12/2004 | Karjala et al. | 726/15 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0187928 A1 | 8/2005 | Byers | |
| 2005/0193390 A1 | 9/2005 | Suzuki et al. | 717/178 |
| 2005/0195757 A1 | 9/2005 | Kidder et al. | 370/278 |
| 2005/0201397 A1 | 9/2005 | Petite | 370/401 |
| 2005/0228874 A1 | 10/2005 | Edgett et al. | 709/220 |
| 2005/0243867 A1 | 11/2005 | Petite | 370/474 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer, III et al. | 370/337 |
| 2006/0111111 A1 | 5/2006 | Ovadia | 455/439 |
| 2006/0130053 A1 | 6/2006 | Buljore et al. | 717/173 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/295 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0059986 A1* | 3/2007 | Rockwell | 439/638 |
| 2007/0060147 A1 | 3/2007 | Shin et al. | 455/445 |
| 2007/0063866 A1 | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 | 7/2007 | Ballou, Jr. et al. | 709/227 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.02 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |

(56) References Cited

U.S. PATENT DOCUMENTS

| | | | |
|---|---|---|---|
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2008/0318547 A1 | 12/2008 | Ballou, Jr. et al. | 455/410 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046724 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakroaborty et al. | 379/201.03 |
| 2009/0132220 A1 | 5/2009 | Chakroborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135843 A1 | 5/2009 | Veillette | 370/406 |
| 2009/0136042 A1 | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167291 A1* | 7/2009 | Richeson et al. | 324/107 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1* | 10/2009 | Crichlow | 340/870.02 |
| 2009/0285124 A1 | 11/2009 | Aguirre et al. | 370/255 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | Van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0238917 A1 | 9/2010 | Silverman et al. | 370/350 |
| 2010/0256830 A1 | 10/2010 | Kressner et al. | 700/291 |
| 2011/0004358 A1 | 1/2011 | Pollack et al. | 700/297 |
| 2011/0035073 A1 | 2/2011 | Ozog | 700/291 |
| 2011/0066297 A1 | 3/2011 | Saberi et al. | 700/287 |
| 2011/0115642 A1* | 5/2011 | Gilbert et al. | 340/870.02 |

FOREIGN PATENT DOCUMENTS

| | | | | |
|---|---|---|---|---|
| EP | 0 812 502 B1 | 8/2004 | | H04L 12/28 |
| EP | 0 740 873 B1 | 12/2005 | | H04L 12/44 |
| JP | 10-070774 | 3/1998 | | H04Q 5/00 |
| JP | 10-135965 | 5/1998 | | H04L 12/28 |
| WO | WO 95/12942 | 5/1995 | | H04L 12/44 |
| WO | WO 96/10307 | 4/1996 | | H04L 12/28 |
| WO | WO 96/10307 A1 | 4/1996 | | H04L 12/28 |
| WO | WO 2008/092268 A1 | 8/2000 | | G01D 7/06 |
| WO | WO 00/54237 | 9/2000 | | G08B 23/00 |
| WO | WO 01/26334 A2 | 4/2001 | | H04L 29/06 |
| WO | WO 01/55865 A1 | 8/2001 | | G06F 13/00 |
| WO | WO 03/015452 | 2/2003 | | H04Q 9/00 |
| WO | WO 2005/091303 | 9/2005 | | G06F 9/445 |
| WO | WO 2006/059195 | 6/2006 | | G05D 3/12 |
| WO | WO 2007/015822 | 8/2007 | | H04L 12/28 |
| WO | WO 2007/132473 | 11/2007 | | G08C 17/00 |
| WO | WO 2008/027457 | 3/2008 | | G08B 23/00 |
| WO | WO 2008/033287 A2 | 3/2008 | | G08B 23/00 |
| WO | WO 2008/033514 A2 | 3/2008 | | G08B 25/00 |
| WO | WO 2008/038072 | 4/2008 | | H04Q 7/24 |
| WO | WO 2009/067251 | 5/2009 | | G08C 19/00 |

OTHER PUBLICATIONS

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "Bahama: A Broadband Ad-Hoc Wireless ATM Local-Area Network," 1995 IEEE International Conference on Com- (56) References Cited

OTHER PUBLICATIONS munications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Reexamination U.S. Appl. No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department*, University of California, Berkeley, 12 pp., 1996.
Johnson, David B., "Routing in Ad Hoc Networks of Mobile Hosts," *IEEE*, pp. 158-163, 1995.
Nachum Shacham, Edwin B. Brownrigg, & Clifford A. Lynch, *A Packet Radio Network For Library Automation*, 1987 IEEE Military Communications Conference, vol. 2 at 21.3.1, (Oct. 1987). (TN-IP 0004176-82).
Nachum Shacham & Janet D. Tornow, Future Directions in Packet Radio Technology, Proc. of the IEEE Infocom 1985 at 93 (Mar. 1985). (TN-IP 0005080-86), 17 pp.
John Jubin & Janet D. Tornow, The DARPA Packet Radio Network Protocols, Proc. of the IEEE, vol. 75, No. 1 at 21 (Jan. 87). (TN-IP 0004930-41).
John Jubin, Current Packet Radio Network Protocols, Proc. of the IEEE Infocom1985 at 86 (Mar. 1985), (TN-IP 0004921-29), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.
David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.
Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.
Robert E. Kahn, et al., Advances in Packet Radio Technology, Proc. of the IEEE, vol. 66, No. 11, pp. 1468-1496 (Nov. 1978), (TN-IP 0004942-71).
Clifford A. Lynch & Edwin B. Brownrigg, Packet Radio Networks, Bergamon Press, 259-74 (1987), (TN-IP 0004018-175).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.
Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.
William S. Hortos, Application of Neural Networks to the Dynamic Spatial Distribution of Nodes within an Urban Wireless Network, SPIE, vol. 2492, p. 58-70, 1995.
Nachum Shacham and Richard G. Ogier, Network Control and Data Transport for C3I Applications, IEEE 1987, p. 30.5.1-6.
John E. Rustad, Reidar Skaug, and Andreas Aasen, New Radio Networks for Tactical Communication, IEEE Jornal on Selected Areas in Communications, vol. 8, No. 5, p. 713- 27, Jun. 1990.
Barry M. Leiner, Donald L. Nielson, and Fouad A. Tobagi, Issues in Packet Radio Network Design, Proceedings of the IEEE, vol. 75, No. 1, p. 6-20, Jan. 1987.
Janet Tornow, Functional Summary of the DARPA SURAP1 Network, DARPA, Sep. 1986, 17 pp.
John F. Shoch and Lawrence Stewart, Interconnecting Local Networks via the Packet Radio Network, Sixth Data Communications Symposium, Nov. 1979, pp. 153-158.
J.R. Cleveland, Performance and Design Considerations for Mobile Mesh Networks, IEEE MILCOM 96, vol. 1, p. 245-49.
Cmdr. R. E. Bruninga, USN, A Worldwide Packet Radio Network, Signal, vol. 42, No. 10, p. 221-230, Jun. 1988.

(56) References Cited

OTHER PUBLICATIONS

Nachum Shacham and Janet Tornow, Packet Radio Networking, Telecommunications, vol. 20, No. 9, p. 42-48, 64, 82, Sep. 1986.
Spencer T. Carlisle, Edison's NetComm Project, IEEE 1989, Paper No. 89CH2709-4-B5, p. B5-1-B5-4.
Brian H. Davies and T.R. Davies, The Application of Packet Switching Techniques to Combat Net Radio, Proceedings of the IEEE, vol. 75, No. 1, p. 43-55, Jan. 1987.
Fouad A. Tobagi, Richard Binder, and Barry Leiner, Packet Radio and Satellite Networks, IEEE Communications Magazine, vol. 22, No. 11, p. 24-40, Nov. 1984.
M. Scott Corson, Joseph Macker, and Stephen G. Batsell, Architectural Considerations for Mobile Mesh Networking, IEEE MILCOM 96, vol. 1, p. 225-9.
K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.
J. Jonquin Garcia-Luna-Aceves, A Fail-Safe Routing Algorithm for Multihop Packet-Radio Networks, IEEE INFOCOM '86, p. 434-43, Apr. 8-10, 1986.
Johanes P. Tamtomo, A Prototype of TCP/IP-Based Internet-PRNET for Land Information Networks and Services, Department of Surveying Engineering, University of New Brunswick, Jan. 25, 1993, 118 pp.
A. Alwan, et al., Adaptive Mobile Multimedia Networks, IEEE Personal Communications, p. 34-51, Apr. 1996.
Michael Ball, et al., *Reliability of Packet Switching Broadcast Radio Networks*, IEEE Transactions on Circuits and Systems, vol. Cas-23, No. 12, p. 806-13, Dec. 1976.
Kenneth Brayer, Implementation and Performance of Survivable Computer Communication with Autonomous Decentralized Control, IEEE Communications Magazine, p. 34-41, Jul. 1983.
Weidong Chen and Eric Lin, *Route Optimization and Locations Updates for Mobile Hosts*, Proceedings of the 16$^{th}$ ICDCS, p. 319-326, 1996.
Daniel Cohen, Jonathan B. Postel, and Raphael Rom, *IP Addressing and Routing in a Local Wireless Network*, IEEE INFOCOM 1992, p. 5A.3.1-7.
Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009).
Jonathan J. Hahn and David M. Stolle, *Packet Radio Network Routing Algorithms: A Survey*, IEEE Communications Magazine, vol. 22, No. 11, p. 41-7, Nov. 1984.
David A. Hall, *Tactical Internet System Architecture for the Task Force XXI*, IEEE 1996, p. 219-30.
Robert Hinden and Alan Sheltzer, *The DARPA Internet Gateway*, DARPA RFC 823, Sep. 1982, 45 pp.
Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.
David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.
David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.
Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.
Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.
Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller-Heart of the Digitized Battlefield*, Proceedings of the 1996 Tactical Communications Conference, Apr. 30-May 2, 1996, Fort Wayne, Indiana, p. 417-21.
Nachum Shacham and Earl J. Craighill, *Dynamic Routing for Real-Time Data Transport in Packet Radio Networks*, Proceedings of INFOCOM 1982, IEEE 1982, p. 152-58.
R. Lee Hamilton, Jr. and Hsien-Chuen Yu, *Optimal Routing in Multihop Packet Radio Networks*, IEEE 1990, p. 389-96.
Carl A. Sunshine, *Addressing Problems in Multi-Network Systems*, Proceedings of INFOCOM 1982, IEEE 1982, p. 12-18.
J.J. Garcia-Luna-Aceves, *Routing Management in Very Large-Scale Networks*, North-Holland, Future Generations Computer Systems 4, 1988, pp. 81-93.
J.J. Garcia-Luna-Aceves, *A Minimum-hop Routing Algorithm Based on Distributed Information*, North-Holland, Computer Networks and ISDN Systems 16, 1988/89, p. 367-382.
D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.
Jens Zander and Robert Forchheimer, *The Softnet Project: A Retrospect*, IEEE EUROCON, Jun. 13-17, 1988, p. 343-5.
Mario Gerla and Jack Tzu-Chich Tsai, *Multicluster, Mobile, Multimedia Radio Network*, Wireless Networks 1, J.C. Baltzer AG, Science Publishers, 1995, p. 255-265.
F. G. Harrison, *Microwave Radio in the British TeleCom Access Network*, Second IEE National Conference on Telecommunications, Conference Publication No. 300, Apr. 2-5, 1989, p. 208-13.
Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.
Fadi F. Wahhab, *Multi-Path Routing Protocol for Rapidly Deployable Radio Networks*, Thesis submitted to the Department of Electrical Engineering and Computer Science of the University of Kansas, 1994, 59 pp.
Jil Westcott and Gregory Lauer, *Hierarchical Routing for Very Large Networks*, IEEE MILCOM 1984, Oct. 21-24, 1984, Conference Record vol. 2, p. 214-8.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.

(56) References Cited

OTHER PUBLICATIONS

International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-r12n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-r12n-routing-reqs-01.txt," IETF Standard-Working-Draft, Internet Engineering Task Force, IETF, CH, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks," Modeling, Analysis and Simulation of Computer and Telecommunications Systems, 10th IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, vol. Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MaC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, Dew Analysis of Renewable, PEV & Storage, Tempe, Arizona, 36 pp., Nov. 8-9, 2010.
"Network Device: Gateway Specification," ZigBee Alliance, ZigBee Document 075468r35, Revision 35, Version No. 1.0, 301 pp., Mar. 23, 2011.
International Search Report and Written Opinion for Application No. PCT/US12/28135, dated Jul. 5, 2012, 7 pp.

* cited by examiner

PROCESS, DEVICE AND SYSTEM FOR VOLT/VAR OPTIMIZATION

CROSS-REFERENCE TO RELATED APPLICATIONS

The present application claims benefit of similarly titled U.S. provisional patent application Ser. No. 61/432,815 filed Jan. 14, 2011, which is incorporated herein by reference in its entirety.

FIELD OF THE INVENTION

The present invention relates to volt/VAR optimization, and in particular to time-synchronized processes, devices and systems for volt/VAR optimization that may be automated.

BACKGROUND OF THE INVENTION

Standard C84.1 of the American National Standards Institute (ANSI) specifies that service voltage levels should be maintained at ±5% for 120 volt nominal service voltage to customer meters, for a range of 114 volts to 126 volts. Generally, utilities are highly motivated to reduce system voltage in order to the use less fuel and/or to use fuel more efficiently, to reduce carbon dioxide emissions, and to prolong equipment life. However, because of system losses and compensation for peak demand periods, utilities tend to provide service on the upper end of the C84.1 requirement (i.e., around 126 volts).

Typical voltage and VAR (Volt-Ampere or Volt Amperes Reactance) control devices include, for example, transformers provided with tap changers for adjusting transformer output voltage, feeder meters within substations to monitor the particular phase voltages on the feeders, and capacitor banks to reduce nonproductive reactive power flows through the distribution network. Such control devices may be used, for example, in an attempt to minimize power loss without causing voltage violations.

Generally, a VAR is useless energy that is created by a phase shift between the voltage and current in a line. VARs are introduced into the system through capacitance and inductive loading generated by customer equipment, such as but not limited to electronics, heavy industrial equipment, and the like. To remove VAR, one either has to increase the amount of power generation or implement controls, e.g., capacitance banks, in the grid to compensate for the VARs and realign the voltage and current sine waves. A capacitance bank introduces a phase shift into the network to compensate for the shift between the voltage and current sine waves in an attempt to counteract the losses associated with VARs. However, capacitance banks are not necessarily effective to counteract all VAR, and the utility typically still generates extra power to make up for the VARs that are in the system.

In current control scenarios, there are multiple control devices on a distribution network that are used and monitored independently of one another. More particularly, the grid controls in use today typically lack two-way communication, switching in or out automatically based on supervisory control and/or data acquisition (SCADA) interaction. Accordingly, there is minimal coordination within the system when an adjustment is made (e.g., coordination at one transformer when a switching event occurs at another transformers in the same network). Additionally, even if these controls are implemented on the distribution side of the grid, utilities may not have access to collected event data, resulting in a system with very little transparency. As such, with data about individual control events, there is a limit to what can be initiated by utilities to make corrections that affect their end users. This uncoordinated scenario is not optimal.

There is therefore a need in the art for a process, device and system that deploys a plurality of sensors to the grid to monitor the effect of a switching event at the grid level on a real-time synchronized basis.

SUMMARY OF THE INVENTION

Embodiments of the invention propose volt/VAR optimization that may be time synchronized and automated based on actions invoked at a grid control system utilizing an Advanced Metering Infrastructure (AMI) or smart grid solution (hereafter "smart grid") that incorporates metering end points which are capable of reporting to a utility the information that is needed by the utility or to another system for making real time decisions on events that may have to occur at the distribution level. Embodiments of the invention incorporate large numbers of end points (e.g., smart meters) which a utility can employ to determine how any event or events it may invoke at the grid level affect its compliance at the end user level.

In one aspect of the invention, a system is provided including a first mesh gate associated with a first network. The first mesh gate is in communication with a first meter that is associated with a circuit and the first meter is adapted to read first meter information over a period of time. The first mesh gate is adapted to transmit the first meter information over a second network.

The system also includes a second meter synchronized with the first meter and associated with the first mesh gate of the first network. The second meter may be associated with the circuit and may be adapted to read second meter information over the period of time. The first mesh gate may be further adapted to transmit the second meter information over the second network.

A server may also be included in the system, and the server may be adapted to receive the first and second meter information from the first mesh gate via the second network. The first mesh gate may transmit the first meter information and the second meter information in response to a switching event impacting the circuit. In another aspect of the invention, a method is provided including, in response to an issued switching event, receiving, by a head end server associated with a mesh network, a first meter information from a first meter associated with the mesh network and associated with a circuit. The method also include, in response to the issued switching event, receiving, by the head end server, a second meter information from a second meter synchronized with the first meter, the second meter associated with the mesh network and the circuit. The head end server may then transmit the first and second meter information to a utility server. Accordingly, the utility server may determine the effect of the switching event, based on the first and second meter information.

In another aspect of the invention, a method is provided where, in response to an issued switching event, a head end server associated with a mesh network receives a first meter information from a first meter associated with the mesh network and associated with a circuit. In response to the issued switching event, the head end server also receives second meter information from a second meter synchronized with the first meter, the second meter associated with the mesh network and the circuit. The head end server may transmit the first and second meter information to a utility serve, and the utility server may determine the effect of the switching event based on the first and second meter information.

DETAILED DESCRIPTION

Smart grid systems measure, collect and analyze utility usage from advanced devices such as electricity meters through a network, such as a mesh network, on request or on a pre-defined schedule. This infrastructure includes hardware, software, communications, customer associated systems and meter data management software. The infrastructure collects and distributes information to customers, suppliers, utility companies and service providers.

Figure 1:
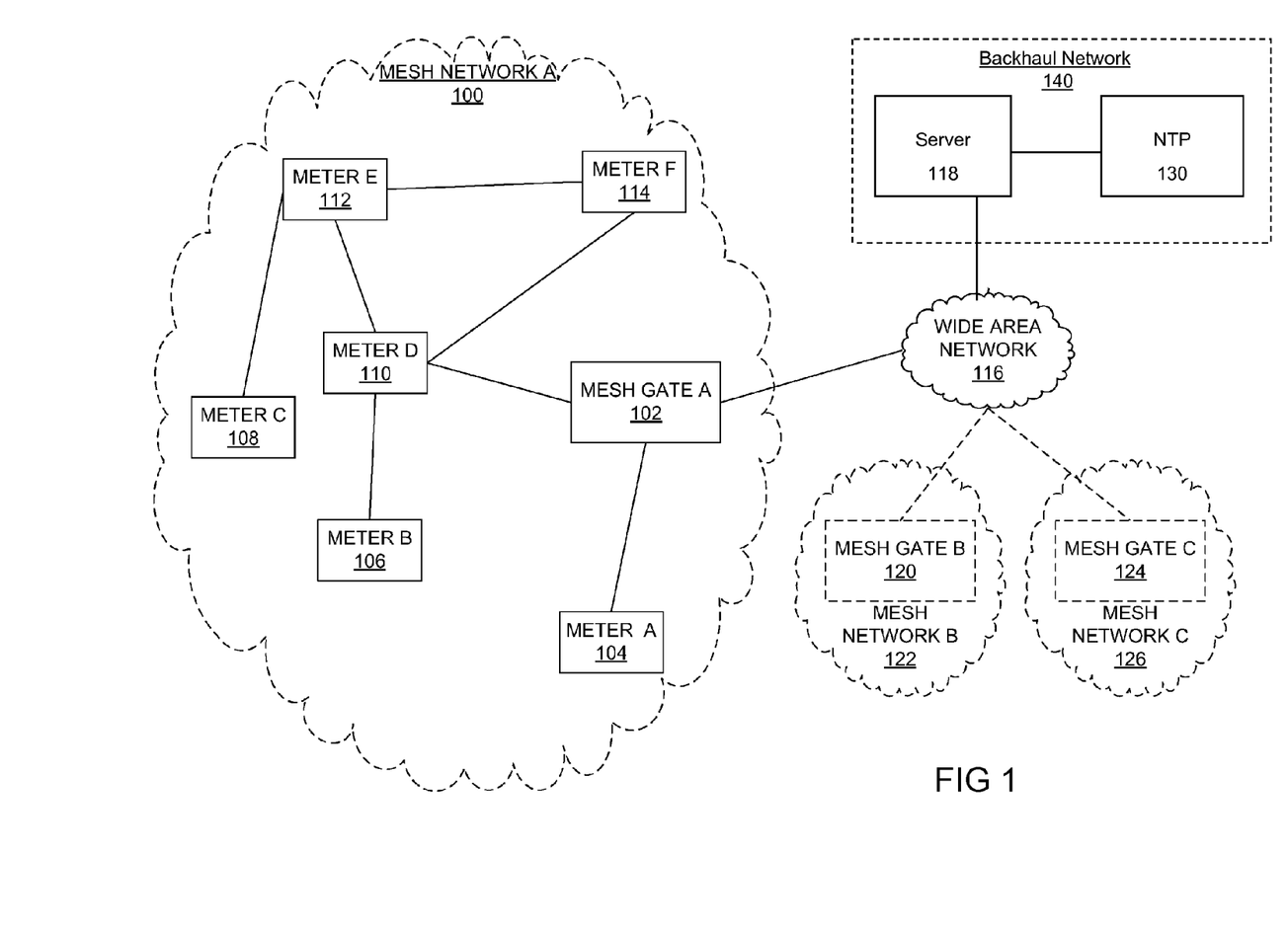
FIG. 1 illustrates an exemplary system for providing smart grid communications over a mesh network.

Referring to FIG. 1, an exemplary smart meter mesh network system for providing smart grid communications within and to/from at least one mesh network is illustrated. As shown, a mesh network A 100 may include a mesh gate A 102 and a plurality of meters: meters A 104, B 106, C 108, D 110, E 112, and F 114. A mesh gate may also be referred to as a NAN-WAN gate, a collector, a concentrator, or an access point. The mesh gate A 102 may communicate with a server 118 over a wide area network (WAN) 116 and it will be appreciated that any number of mesh gates may communicate with the server (e.g., mesh gate B 120 and mesh gate C 124).

In addition to the mesh gate A 102, the mesh network A 100 may include a plurality of mesh devices, e.g., meters (as shown) or communication hubs, which cover a geographical area. The mesh gate A 102 may aggregate information from mesh devices within the mesh network A 100 and transmit the information to the server 118. The mesh devices may be in communication with or may otherwise include one or more utility sensors for monitoring utility usage, such as gas, water, or electricity usage and usage patterns at a specific customer location. Alternative mesh devices may include thermostats, user displays, and other components for monitoring utilities, which may be part of a home area network ("HAN").

The meters A 104, B 106, C 108, D 110, E 112, and F 114 may be associated with the mesh network A 100 through direct or indirect communications with the mesh gate A 102. Each meter may forward transmissions from other meters within the mesh network A 100 towards the mesh gate A. It will be appreciated that while only six meters are depicted in the mesh network A 100, any number of mesh devices may be deployed to cover any number of utility lines or locations, subject to bandwidth constraints with the mesh network and the mesh gate.

As depicted, only meters A 104 and D 110 are in direct communications with mesh gate A 102. However, meters B 106, E 112 and F 114 can all reach mesh gate A 102 through meter D 110. Similarly, meter C 108 can reach mesh gate A 102 through meter E 112 and meter D 110.

The WAN 116 may be any communication medium capable of transmitting digital information. For example, the WAN 116 may be the Internet, a cellular network, a private network, a phone line configured to carry a dial-up connection, or any other network.

The head end server 118 may be a computing device configured to receive information, such as meter readings or other usage data, from a plurality of mesh networks and meters. The server 118 may also be configured to transmit instructions to the mesh networks, mesh gates, and mesh devices. The server 118 may be a central processing system including one or more computing systems (i.e., one or more server computers). Where the head end includes more than one computing system, the computing systems can be connected by one or more networks and the system may be referred to as a "backhaul network" 140.

The number of mesh networks, e.g., mesh networks B 12 and C 126 are similar to mesh network A 100 in operation, as discussed above.

Descriptions of exemplary mesh networks, including electric meters and other mesh devices, can be found in commonly owned U.S. patent application Ser. No. 12/275,252 entitled Method and System for Creating and Managing Association and Balancing of a Mesh Device in a Mesh Network," filed Nov. 21, 2008, which is incorporated herein by reference in its entirety.

Figure 2A:
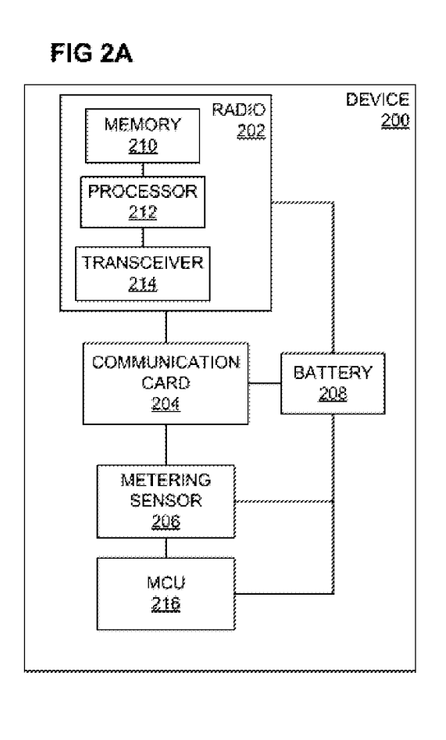
FIG. 2A illustrates an exemplary meter device for use within a mesh network.

Referring to FIG. 2A, an exemplary meter for use within a mesh network is shown. A meter 200 may include a radio 202, a communication card 204, a metering sensor 206, and a battery or other power or energy storage device 208. The radio 202 may include a memory 210, a processor 212, a transceiver 214, and a microcontroller unit (MCU) 216. Generally, the communication card 204 may interface between the radio and a sensor 206 and sensor readings may be converted to radio signals for transmission over the radio. The memory 210 may store instructions and run-time variables for execution. For example, the memory 210 may include both volatile and non-volatile memory. The memory 210 may also store a history of sensor readings from the metering sensor 206 and an incoming queue of server instructions.

A meter 200 may communicate with a mesh gate and other mesh devices over a mesh network. For example, the meter 200 may be an electricity meter installed in a residential building or other location to monitor electricity usage. The meter 200 may also control access to energy in response to server instructions, for example, by reducing or stopping the flow of electricity.

Figure 2B:
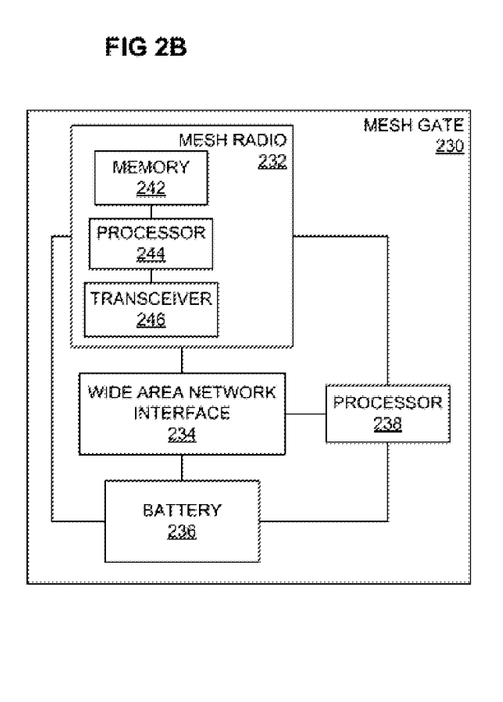
FIG. 2B illustrates an exemplary mesh gate for use within a mesh network.

Referring to FIG. 2B, an exemplary mesh gate 230 for use within a mesh network is illustrated. As shown, the mesh gate 230 may include a mesh radio 232, a wide area network interface 234, a battery 236, and a processor 238. The mesh radio 232 may include a memory 242, a processor 244, and a transceiver 246. The mesh gate 230 may also include a WAN interface 234, a battery 236 and a processor 238. The mesh gate 230 may interface between mesh devices such as meters over a mesh network and a server over a WAN. The mesh gate 230 may be installed in a central location relative to the meters and also communicate with a server over a WAN. By acting as a gateway, the mesh gate forwards information and instructions between the meters in its mesh network and the server. The mesh gate may also function as a node within the mesh network, by forwarding messages between meters.

Embodiments of the invention provide a process, device and system for volt/VAR optimization at the grid level, for example, involving adding sensors to the grid, using alarms for power quality events, and monitoring a feedback loop using mesh devices. In one embodiment, one or more metering end points (i.e., meters) of a smart grid network are adapted to determine and report meter information to a utility (e.g., to one or more utility servers) or to other systems via a head end server in real-time or near real-time. As used herein, "meter information" may include, but is not limited to, voltage data (i.e., instantaneous voltage, average voltage over a period of time, high voltage over a period of time, low voltage over a period of time, and/or the like), phase angle data, and VAR (Volt-Ampere or Volt Amperes Reactance) information read at a meter.

In certain embodiments, smart meters in a mesh network may capture meter information and may report that information to a head end server through a mesh gate. The head end server may store the information in, for example a database or the like, and may transmit the information to a utility server. Using the meter information, the utility may make decisions about switching events that have occurred and/or switching events that may be required or desired at a distribution level, such that the voltage and/or VAR may be optimized within the grid. Generally, any device deployed within the mesh network may determine and provide such meter information, without the need to employ additional sensors. In this way, the capabilities of one or more meters located throughout a distribution circuit are leveraged to provide an improved reporting mechanism.

As an example, one or more customers of a utility, whether residential or commercial, may receive electricity through at least one metering endpoint (i.e., meters). Any number of these end points may determine relevant meter information over a given time period and such meter information may be used by the utility to determine how any event or events invoked by a utility at the distribution level affect compliance with, for example, ANSI standards at the end-user level. By utilizing usage-related meter data collected from meters at many, or even all, of the residences (or buildings) that may be affected in a particular distribution circuit, greater accuracy and resolution of the distribution grid may be ascertained by the utility.

Generally, accurate voltage profiling may be determined by sampling voltage load profile data across any number of meters, at the same or similar frequency, and at synchronized time intervals for periods of time. In this way, meter data, such as but not limited to, minimum, average, and maximum voltage reads may be provided to a head end for a specific time interval across any group of meters on a circuit. In addition, if instantaneous watts or kilowatts is captured at the same sampling frequency, estimated current can be calculated, which can be sufficiently accurate, for example, for planning purposes. In one embodiment, the synchronization and sampling may be controlled at the head end by, for example, an application running at the head end.

In one embodiment, the head end may acquire meter information from one or more meters throughout the network to maintain a database of historic meter information (e.g., historic voltage profile data of instantaneous voltage values throughout the entire meter population in a given network). Such meter information may be gathered with interval reads of 1 to 2 hours apart, however such data may typically be pushed or polled from the meters once every 24 hours.

Referring back to FIG. 1, each mesh gate 102, 120, 124 may be configured to use a backhaul network 140 to automatically obtain a time reference from a Network Time Protocol (NTP) server 130 such as those hosted by the National Institute of Standards and Technology in the United States or the National Research Council in Canada. These NTP servers 130 provide Coordinated Universal Time (UTC) to within 10 milliseconds over the public Internet, with no information about time zones or daylight saving time.

Once a mesh gate (e.g., 102) is referenced to a time base, network synchronization may be propagated to all mesh devices (e.g., 104, 106, 108, etc.) through the mesh network, with each meter adjusting its clock to its associated mesh gate. Accuracy to the mesh gate's clock may be maintained to within 100s of milliseconds.

Because advanced meters and C&I meters (collectively, "smart meters") have their own native real-time clock for time-stamping and processing data, smart meters may be synchronized differently than basic residential meters with standard communication modules. An advanced communication module for smart meters allows the module to extract data from the meter autonomously and report it to the server per a configurable schedule, allows native meter alarms to be delivered in real-time, and, with respect to time synchronization, allows the advanced communication module to adjust the native meter clock with some autonomy.

Referring again to FIG. 2, synchronization of meter reads may be achieved using a clock on the network interface card (NIC) ("communication card" 204). Each meter 200 has such a card that is synchronized with a Network Time Protocol (NTP) server. Generally, each clock uses intervals based on minute boundaries and begins at one minute. Thus, the boundary of the minute synchronizes the readings so that all of the meter information reads that are taken are synchronized across the network. For example, if one meter takes a voltage read precisely at 12:00:00 noon, all of the meters may take a voltage read precisely at 12:00:00 noon. Moreover, each meter read may be time and date stamped. In this way, synchronization of all meters across the network is provided.

In certain embodiments, meter readings may be time synced and automated based on actions invoked at a grid control system. For example, when a utility or grid control system (e.g., a distribution management system or the like) issues a command to activate a switching event in a particular distribution circuit, not only is the device that was switched monitored before and after the event, but also strategic meters in the particular circuit are utilized as a feedback loop mechanism to see how the event settled in the circuit.

According to embodiments of the invention, the control system issues a switching event to a device on the distribution circuit, such as but not limited to a tap changer or capacitor bank, and a sensor may take a reading of grid information (e.g., voltage, current) at the device before switch event parameters and after switch event parameters. These before and after grid information reads are reads at the grid level, i.e. at particular control devices in the distribution circuit. The before read is the utility's read by which the utility detects something that leads to a decision for a switch on a particular device resulting in the utility determining to initiate a switching event. For historical purposes, the utility should know what drove the event with the before read and then the utility should understand what happened after the event with the after read. Accordingly, the grid information may be transmitted to the utility and/or control system and may be stored and/or displayed. It will be appreciated that the head end server may format such information such that it is compatible with these other systems.

The switch event may trigger a targeted group of meters in the affected circuit to begin sending synchronized meter information at certain time intervals (e.g., every minute) for a period of time (e.g., 5, 10, 15 or 20 minutes) to determine if the switching event had the desired effect, and the meter information is analyzed for further action by the control system, if necessary. For example, a utility server may communicate the switching event to a head-end server in a mesh network. The head end server may then transmit instructions to send synchronized meter information to one or more mesh devices in communication with meters in the affected circuit.

In one embodiment, the mesh information may be monitored as part of an automated feedback system. Such monitoring may be important to determine the effect of switching events (e.g., activation of voltage regulators, capacitor banks, and load tap changers) on the system, and to determine whether service voltage level compliance is still being met after such an event. Such level of control may be necessary to achieve a desired reduction in service voltage and/or reduction of VAR.

For example, meter information provided by meters at residences may give the utility an accurate picture on how switching events actually affect the end users and not simply how they affect a distribution line, generally. This may be important because the effect of a switching event is dependent on loads that are being drawn from consumers, and what may work in one circuit may not work in another circuit that may be more or less industrialized. Accordingly, embodiments of the invention may provide resolution down to an actual end user.

In one embodiment, a particular group of meters can be monitored and real time voltage data may be provided to the utility as feedback, for example, for one or five or ten or twenty minutes or for any other period of time requested or configured. This process can be automated, for example, with an application running on a utility company server that sends the request to a server at a head end of the smart grid system. It will be appreciated that the head end server may send instructions to a single mesh device or may send instructions to a group of mesh devices which are determined (by either the head end or the utility server) to be in communication with meters in the affected circuit.

In one embodiment, the head end may acquire information from a utility server and/or a third party control program defining a particular distribution circuit. Using this information, the head end may determine which meters are located at which points along the circuit. Accordingly, the head end may assign groups of meters for meter information monitoring based on the location of the meters and/or based on historical meter information stored at the head end. In certain embodiments, the system may employ an adaptive control group algorithm that dynamically assigns meters to report instantaneous voltage data in real time or near real time, wherein the groups may be optimized to provide the most accurate and effective control for voltage levels. However, in other embodiments, the group of meters may be selected by a user. It will be appreciated that the head end may provide an interface for such selection.

In this way, embodiments of the invention can provide meter information after a switching event to show how that event settled within the grid and how the voltage is still within or out of tolerance of the compliance voltage. Based on the meter information provided, the utility can make better decisions at that granularity level on how much to switch in, how much to switch out, and the like. Moreover, the capability to read the voltage already exists in each meter and is not something that must be added, so that embodiments of the invention leverage existing capabilities in the existing smart grid system.

It is to be noted that voltage is generally always present on each meter, and the meters, depending on the design, typically determine an instantaneous voltage read and refresh every few seconds, for example, every five or ten seconds or at some other suitable interval. In a smart grid system, a network interface card (NIC) may read the refreshed value. When a switching event occurs, the utility may then send a message to the smart grid system head end asking for, for example, real time data from a particular group of meters for a period of time. In other embodiments, the head end server may determine which meters to request meter information from.

Responsive to that request, there may be a subset setting at each meter that determines the instantaneous voltage for a particular time interval (e.g., one minute) during a period of time. It is important that each end point be synchronized such that it may determine a voltage read at exactly the same time.

In other embodiments, the meter information may be used to determine a course of action at the distribution level. For example, the meter information may be used to initiate real-time or near real-time activation of grid controls (e.g., switching events). The meter information read by a meter may be sent to the head end, and then passed on to a control system (e.g., a control system server), which controls the grid. The control system may analyze the meter information and may determine if action is necessary. With each event for which this is done, the utility is provided with historical data that the utility can then use for future switching events to decide how to better control the grid. The more this type of data is utilized, the tighter the utility should be able to monitor its voltage which will in turn enable the utility to reach the end goal of reducing generation.

Alarms may also be employed such that power quality events at the service level initiate real-time or near real-time activation of grid controls. For example, if the voltage at a particular meter falls below a certain threshold, or is above a certain threshold, this information may be provided to the utility via the head end to make decisions to deal with either situation and an alarm may be employed to notify the utility. Embodiments of the invention can introduce voltage level thresholds that send an alarm to the head end, utilizing, for example, Commercial & Industrial (C&I) meters. A voltage level threshold may be set at any voltage from about 114 volts to about 126 volts, such as but not limited to 114, 115, 116, 117, 118, 119, 120, 121, 122, 123, 124, 125 and/or 126 volts.

In yet other embodiments, the meter information may be used by a utility for compliance reporting. A utility must provide reports, for example, on a monthly basis, on the utility's compliance voltage for their customers through the Federal Energy Regulatory Commission (FERC). The data available via the reporting mechanism for embodiments of the invention can also be used, for example, to compile the compliance voltage reports or even to completely automate meeting the compliance voltage reporting requirements which utilities face.

Embodiments of the invention can also provide, for example, planning and power quality data. A trend line report of the voltage can be available for each meter including minimum values, average values, and maximum values. Trend reports can be enabled to be overlaid by transformer, line segment, and the like for load flow modeling impedance (R, X) values and bad or loose connections. Such power quality data can also include ANSI C84.1 compliance reports and sag and swell reports.

In one example, the meter information can be used by utilities for load flow modeling in developing new neighborhoods and new infrastructure, in deciding on upgrading substations and/or transmission lines, and in making decisions concerning the addition of capacitance banks to the grid. The same or similar information may be used for emergencies and/or accidents and for construction requiring rerouting of existing circuits.

Unless specifically stated otherwise as apparent from the foregoing discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

Some exemplary embodiments described herein are described as software executed on at least one processor, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this invention.

It is to be appreciated that the various components of the technology can be located at distant portions of a distributed network and/or the internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

The invention claimed is:

1. A utility system comprising:
a first mesh gate associated with a first network in communication with a first utility meter associated with a distribution circuit, the first utility meter adapted to read first meter information over a period of time and monitor switching events, and the first mesh gate adapted to transmit the first meter information over a second network;
a second utility meter synchronized with the first utility meter and associated with the first mesh gate of the first network, the second utility meter associated with the distribution circuit and adapted to read second meter information over the period of time and monitor switching events, the first mesh gate further adapted to transmit the second meter information over the second network;
a utility control system located remote from both of the first utility meter and the second utility meter, wherein the utility control system issues an initiation of a switching event to impact the distribution circuit, wherein the switching event comprises activation of a tap changer or capacitor bank on the distribution circuit, and wherein the first and second utility meters are responsive to issuance of the switching event to begin synchronized monitoring of the distribution circuit; and
a server adapted to receive the first and second meter information from the first mesh gate via the second network, so that the server determines if the switching event had a desired effect, based on synchronized first and second meter information,
wherein in response to issuance of the switching event, the server is triggered to monitor the first meter information and the second meter information so as to determine the impact of the switching event on the distribution circuit.

2. A system according to claim 1, wherein the first and second meter information comprises one or more of the group consisting of voltage data, phase angle data, and VAR.

3. A system according to claim 2, wherein the first and second meter information comprises voltage data.

4. A system according to claim 3, wherein the voltage data comprises one or more of the group consisting of instantaneous voltage, average voltage over the period of time, high voltage over the period of time, and low voltage over the period of time.

5. A system according to claim 1, wherein the first and second meter information are transmitted in real-time or near real-time.

6. A system according to claim 1, wherein the first and second utility meters transmit synchronized first and second meter information at time intervals during the period of time.

7. A system according to claim 6, wherein the period of time comprises from about 1 minute to about 20 minutes.

8. A system according to claim 6, wherein the time interval is about one minute.

9. A system according to claim 1, wherein the utility control system in communication with the server, analyzes the first and second meter information to determine if a second switching event is required.

10. A system according to claim 1, wherein the first and second meter information are transmitted for the period of time before the switching event and after the switching event.

11. A system according to claim 1, wherein the switching event is issued when a voltage at the first or second utility meter falls below a certain threshold.

12. A system according to claim 1, wherein the switching event is issued when a voltage at the first or second utility meter is above a certain threshold.

13. A system according to claim 1, wherein the first and second meter information is employed to prepare a compliance report.

14. A method comprising:
in response to a switching event issued so as to cause a desired effect on a distribution circuit, receiving, by a head end server associated with a mesh network, a first meter information from a first utility meter associated with the mesh network and associated with the distribution circuit;
in response to the issued switching event, receiving, by the head end server, a second meter information from a second utility meter synchronized with the first utility meter, the second utility meter associated with the mesh network and the distribution circuit, wherein the switching event comprises activation of a tap changer or capacitor bank on the distribution circuit, and wherein the first and second utility meters are responsive to issuance of the switching event to transmit synchronously monitored first and second meter information;
transmitting, by the head end server, the first and second meter information to a utility server;
determining, by the utility server, based on the first and second meter information received in response to the issuance of the switching event, if the switching event had the desired effect.

15. A method according to claim 14, wherein the first and second meter information comprises one or more of the group consisting of voltage data, phase angle data, and VAR.

16. A method according to claim 14, wherein the first and second meter information comprises voltage data.

17. A method according to claim 16, wherein the voltage data comprises one or more of the group consisting of instantaneous voltage, average voltage over the period of time, high voltage over the period of time, and low voltage over the period of time.

18. A method according to claim 14, wherein the first and second meter information are transmitted in real-time or near real-time.

19. A method according to claim 14, wherein the synchronized first and second meter information are received from the first and second utility meters at a time interval during a period of time.

20. A method according to claim 19, wherein the period of time comprises from about 1 minute to about 20 minutes.

21. A method according to claim 19, wherein the first and second meter information are requested for the period of time before the switching event and after the switching event.

22. A method according to claim 14 further comprising determining, by the utility server, based on the first and second meter information, that a second switching event is required.

23. A method according to claim 14, wherein the switching event is issued when a voltage at the first or second utility meter falls below a certain threshold.

24. A method according to claim 14, wherein the switching event is issued when a voltage at the first or second utility meter is above a certain threshold.

* * * * *